(12) United States Patent
Yan et al.

(10) Patent No.: US 7,067,216 B2
(45) Date of Patent: Jun. 27, 2006

(54) BIPOLAR PLATE GAS MOISTURIZING APPARATUS FOR THE FUEL CELL

(75) Inventors: Yi-Yie Yan, Hsinchu (TW); Fa-Lin Chen, Taipei (TW); Hsin-Sen Chu, Hsinchu (TW); Ruey-Jong Shyu, Hsinchu (TW); Fang-Hei Tsau, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 351 days.

(21) Appl. No.: 10/436,134

(22) Filed: May 13, 2003

(65) Prior Publication Data
US 2004/0121209 A1 Jun. 24, 2004

(30) Foreign Application Priority Data
Dec. 20, 2002 (TW) ............................... 91136852 A

(51) Int. Cl.
*H01M 8/02* (2006.01)
*H01M 8/04* (2006.01)
(52) U.S. Cl. ............................... 429/38; 429/25; 429/39
(58) Field of Classification Search ................ 429/25, 429/34, 35, 36, 37, 38, 39
See application file for complete search history.

(56) References Cited

U.S. PATENT DOCUMENTS

| | | | | | |
|---|---|---|---|---|---|
| 5,952,119 | A | * | 9/1999 | Wilson | 429/34 |
| 6,066,408 | A | * | 5/2000 | Vitale et al. | 429/34 X |
| 6,150,049 | A | * | 11/2000 | Nelson et al. | 429/39 |
| 6,492,054 | B1 | * | 12/2002 | Karakane et al. | 429/34 |
| 2003/0068543 | A1 | * | 4/2003 | Yasuo et al. | 429/38 |

FOREIGN PATENT DOCUMENTS

| | | | |
|---|---|---|---|
| JP | 2000-323159 | * | 11/2000 |
| JP | 2002-151109 | * | 5/2002 |

* cited by examiner

Primary Examiner—Stephen J. Kalafut
(74) Attorney, Agent, or Firm—Birch, Stewart, Kolasch & Birch, LLP

(57) ABSTRACT

A design of bipolar plate gas moisturizing apparatus of the fuel cell is disclosed. Using a channel installed in the middle section of fuel channel and a water-absorptive material attached to its bottom, water is directly guided into the fuel channel of the bipolar plate in the fuel cell. The fuel inside the fuel channel thus obtains sufficient water to enhance the humidity of the proton exchange membrane and the efficiency of the fuel cell.

16 Claims, 5 Drawing Sheets

BIPOLAR PLATE GAS MOISTURIZING APPARATUS FOR THE FUEL CELL

BACKGROUND OF THE INVENTION

1. Field of Invention

The invention relates to a moisturizer for the bipolar plate of a fuel cell and more particularly to a proton exchange membrane fuel cell.

2. Related Art

Energy is the most basic thing in human life. With the advance in technology, human beings make use of all kinds of energy to improve their life and change the history.

However, the utilization of various kinds of energy causes damages to the environment, such as the green house effect and air, water, and soil pollution. Therefore, it is imperative to develop a highly efficient but clean energy sources. In 1839, the English judge William Graff discovered the fuel cell in a private amateur research project. A hundred years later, it is selected as the important power supply in the U.S. space project. In 1965, it is used in Gemini V in its voyage.

The fuel cell has several features that are suitable for modern world. The first is its efficiency. It has a very high energy conversion efficiency, above 40%. If one can recycle the exhaust heat released during its electrochemical reaction, the efficiency can be over 80%. The second feature is its cleanness. It almost produces no pollution at all during the power supply process. Take the largest fuel cell plant with the capacity of 11 megawatts (MW) as an example. It also uses the natural gas as its fuel. The nitrogen-oxygen concentration produced by the plant during its early run is 1 ppm. No sulfur-oxygen compounds and particle pollutants are detected. It is cleaner than the cleanest power plant of other kinds in the world. The third feature is its quietness. The noise in the neighborhood of the 11 MW is below 55 decibel (dB). The fuel cell has wide applications, ranging from power, industrial, transportation, space, and military fields. There are many kinds of products made based upon the idea of fuel cells. Examples are power plants, spare batteries, electric cars, small submarines, and even the power supply for space ships and space shuttles.

The most common fuel cell is the proton exchange membrane fuel cell (PEMFC), also called the polymer membrane fuel cell. The cross section of its single cell is shown in FIG. 1. It is made of a membrane electrode assembly (MEA) 10 sandwiched between two bipolar plates 20.

The MEA 10 is its central part. It has five layers: the anode gas diffusion layer, the anode catalyst layer, the electrolyte layer (proton exchange membrane), the cathode catalyst layer, and the cathode gas diffusion layer. The proton exchange membrane can be a polymer membrane, such as Nafion produced by DuPont. The surface of the proton exchange membrane is further coated with a layer of catalyst and attached with a carbon cloth or paper as the catalyst layer and the gas diffusion layer, respectively.

The bipolar plate 20 is made of an electrically conductive material, such as graphite. Both of its surfaces are engraved with gas channels as the fuel gas channel 21 and oxidant channel 22 of the anode and cathode.

To generate energy, the fuel gas and the oxidant are guided into the fuel channel 21 of the anode and the oxidant channel 22 of the cathode. The fuel gas undergoes an oxidation process with the catalyst on the anode and releases electrons, producing hydrogen ions. The released electrons go out through a circuit to provide the desired current and finally enter the cathode to recombine with the hydrogen ions that pass through the electrolyte. The hydrogen then undergoes a reduction process with the oxygen atoms in the oxidant to form water.

In the use of fuel cells, the fuel gas is normally the hydrogen molecule or a reformate rich in hydrogen. The oxidant is usually oxygen molecules, but air is also used in practice.

To increase or adjust the current and power output from the fuel cell, several single cells can be connected in series to form a cell stack, as shown in FIG. 2. Surrounding the cell stack are collectors 30 and end boards 40. The collector 30 collects the current produced by the complete cell stack. The end boards 40 on both sides have a fuel inlet 41, an oxidant inlet 42, an oxidant outlet 43, and a fuel outlet 44.

In the PEMFC, the current and power produced in the electrochemical reaction determine the efficiency of the fuel cell. Factors that determine the produced current and power include: (1) the design of the fuel channel 21 and the oxidant channel 22 on the bipolar plates 20; (2) the effective area of the catalyst on the MEA 10 surfaces; (3) the material of the proton exchange membrane; and (4) the thickness and gas of the electrode layers.

The main function of the proton exchange membrane in the MEA 10 is to prevent reaction gases, hydrogen and oxygen, from crossing over. It simultaneously blocks electrons but allows hydrogen ions (protons) to enter the cathode side from the anode side in the fuel cell. Therefore, it achieves the same effect as a bridge. However, the transportation of protons in the proton exchange membrane requires water molecules as the medium. Under the electro-osmotic drag, the protons move from the anode to the cathode, forcing water molecules to move in the same direction too. This will result in the proton exchange membrane's drying. The internal resistance of the fuel cell therefore goes up and the efficiency thus decreases.

According to experiments and analyses, when each proton is accompanied by more water molecules and they pass through the proton exchange membrane together, the voltage generated by the fuel cell will be larger as the resistance of the proton gets lower. Therefore, adding appropriate amount of water can effectively increase the efficiency of the fuel cell.

Since each hydrogen molecule can be ionized into two protons, the transportation rate at the proton exchange membrane is limited by its saturation density. Thus, even if one makes the hydrogen gas reach its saturation humidity, the number of water molecules that can travel with each proton is still restricted.

Consequently, it is not sufficient to simply moisturize the fuel at the fuel inlet. This can only make the fuel gas moisturized in the beginning. After passing through the whole fuel channel 21, the water molecules become so few that the protons still have difficulty passing through the proton exchange membrane.

Thus, the fuel cell usually has a lower internal resistance in the wetter region of the fuel channel 21 but a higher on in the dryer region. The net result is that the current density in the early section of the hydrogen incoming channel is higher than that in the later section. How to moisturize the fuel gas in the middle and later sections of the fuel channel 21 in order to lower the internal resistance of the dryer region is a crucial condition to maintain the PEMFC.

Some propose to directly add water supply at the inlet of the fuel channel 21 to moisturize the fuel gas. Although this method can indeed increase the humidity of the fuel gas at the inlet, it inevitably causes many other problems.

First, adding water at the inlet of the fuel channel 21 is likely to flood the gas diffusion layer on the anode if no proper solution is provided. When the gas diffusion layer is flooded with water, the path for the hydrogen to diffuse to the catalyst layer is clogged, resulting in a bad efficiency of the fuel cell.

Secondly, adding water at the inlet of the fuel channel 21 cannot effectively improve the dry situation in the middle and later sections of the fuel channel 21. Therefore, it is not a perfect method.

SUMMARY OF THE INVENTION

In view of the foregoing problems, an objective of the invention is to provide a moisturizing apparatus for bipolar plate fuel gas in the fuel cell. It is installed in the middle section of the fuel channel on the anode side of the fuel cell. This can effectively increase the humidity of the fuel gas in the middle and later sections and thus increase the efficiency of the fuel cell.

According to the invention, the middle section of the bipolar plate fuel channel of the fuel cell is installed with a communication channel that connects to each fuel channel. A layer of water-absorptive material is attached to the bottom of the communication channel. The communication channel is connected to a moisturizing main pipe through a permeating channel. The permeating channel is filled with a water-absorptive material through which water is guided into the fuel channel of the bipolar plate. The fuel gas inside the fuel channel thus obtains sufficient moisture to increase the water content on the proton exchange membrane, thereby enhancing the efficiency of the fuel cell.

The disclosed bipolar plate gas moisturizing apparatus of the fuel cell can achieve the following effects:

(1) The gas moisturizing apparatus can effectively moisturize the fuel gas in the middle and later sections of the fuel channel on the anode side. With the water content increase in the fuel gas, the proton can more easily penetrate through the proton exchange membrane with little resistance. The efficiency of the fuel cell thus becomes better.

(2) The invention provides water-absorptive materials in the communication channel, the permeating channel, and the middle and later sections of the fuel channel. Therefore, the humidity of the fuel gas can be regulated as water evaporates. Therefore, the fuel gas will not be over-moisturized so that the diffusion of the fuel gas is affected.

(3) The permeating channel of the invention enables water to enter the fuel channel through the water-absorptive material. Such a material can prevent the fuel gas from penetrating through the permeating channel.

(4) The moisturizing main pipe has a stop valve to adjust the pressure inside the channels in such a way that water only flows one-way. Adjusting the stop valve can further ensure that the fuel gas does not leak.

(5) The bottom of the communication channel is attached with a water-absorptive material and the water-absorptive material inside each fuel channel is connected. Therefore, the water-absorptive material can obtain sufficient water to moisturize the fuel gas.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
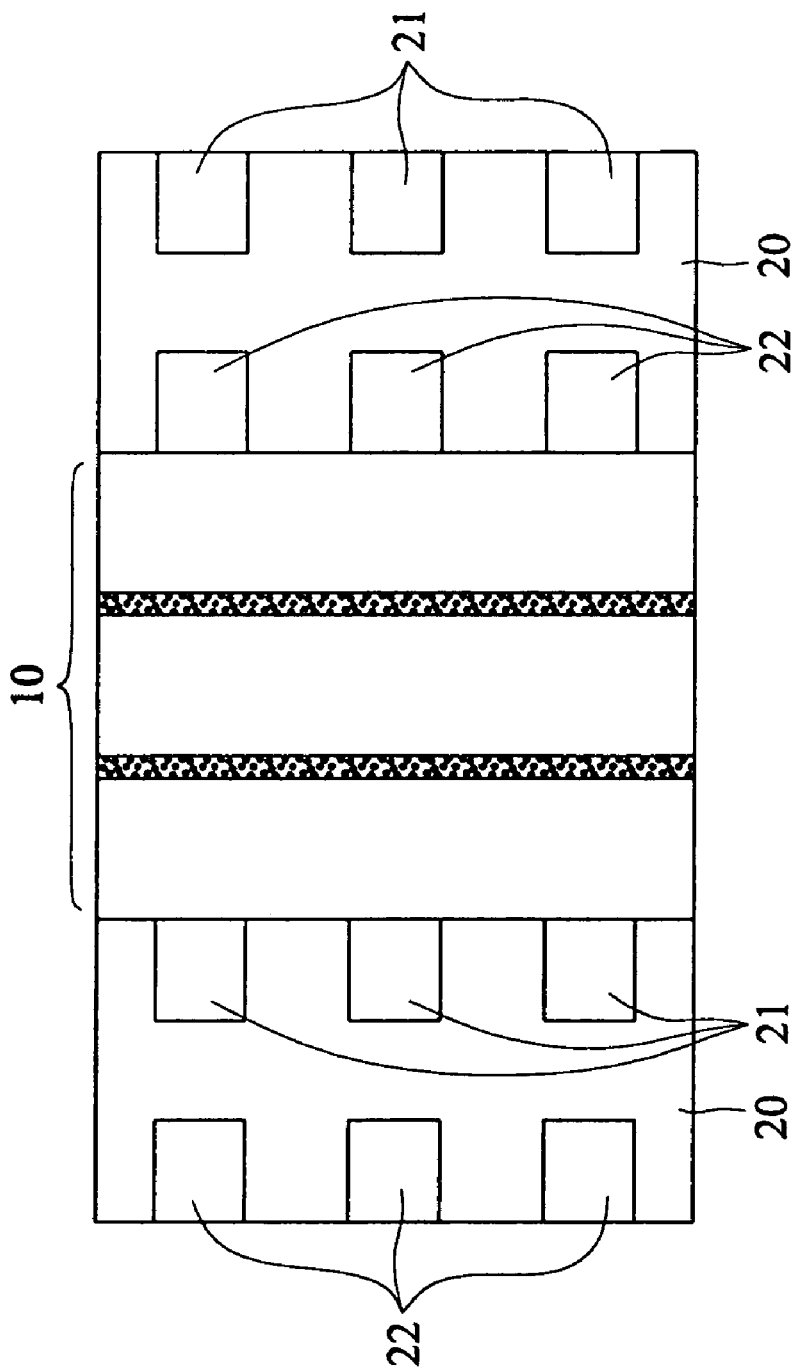
FIG. 1 is a cross-sectional view of the basic structure of a single cell of the PEMFC.
Figure 2:
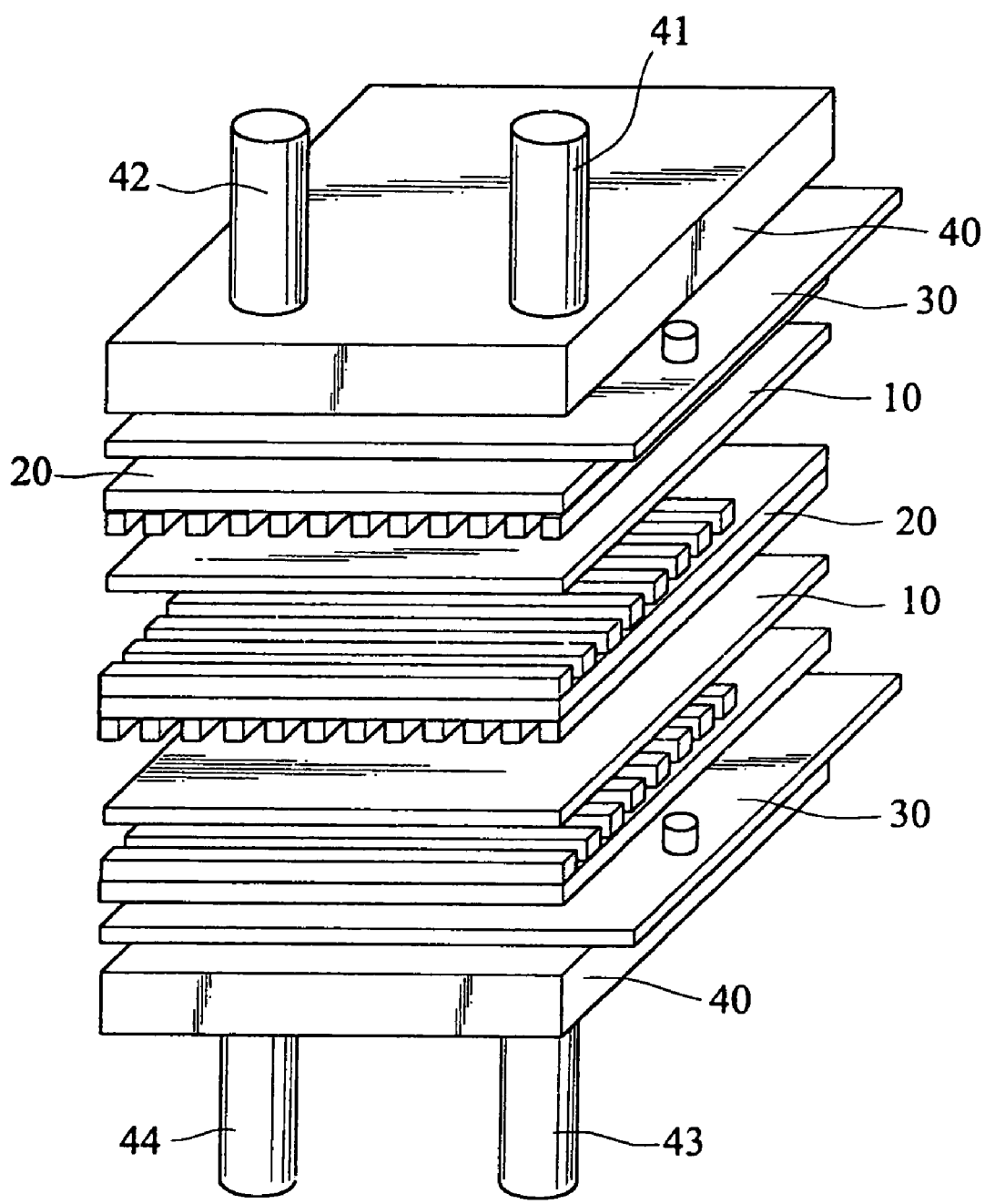
FIG. 2 is an exploded view of the cell stack of the PEMFC.
Figure 3:
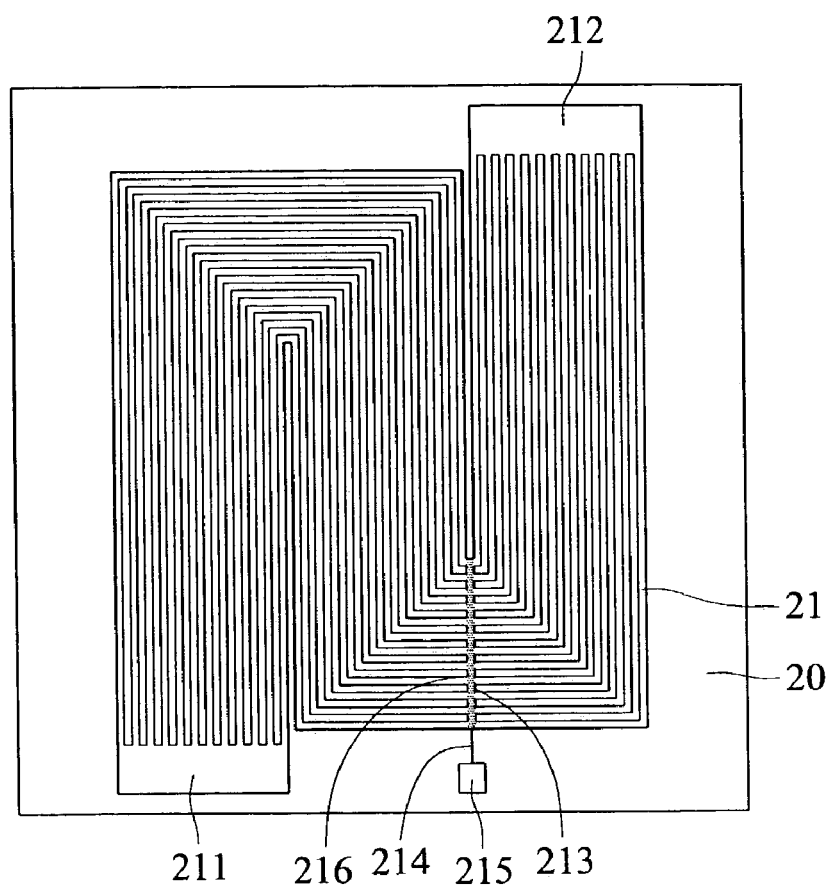
FIG. 3 is a top view of the bipolar plate fuel channel on the anode side according to the invention.
Figure 4:
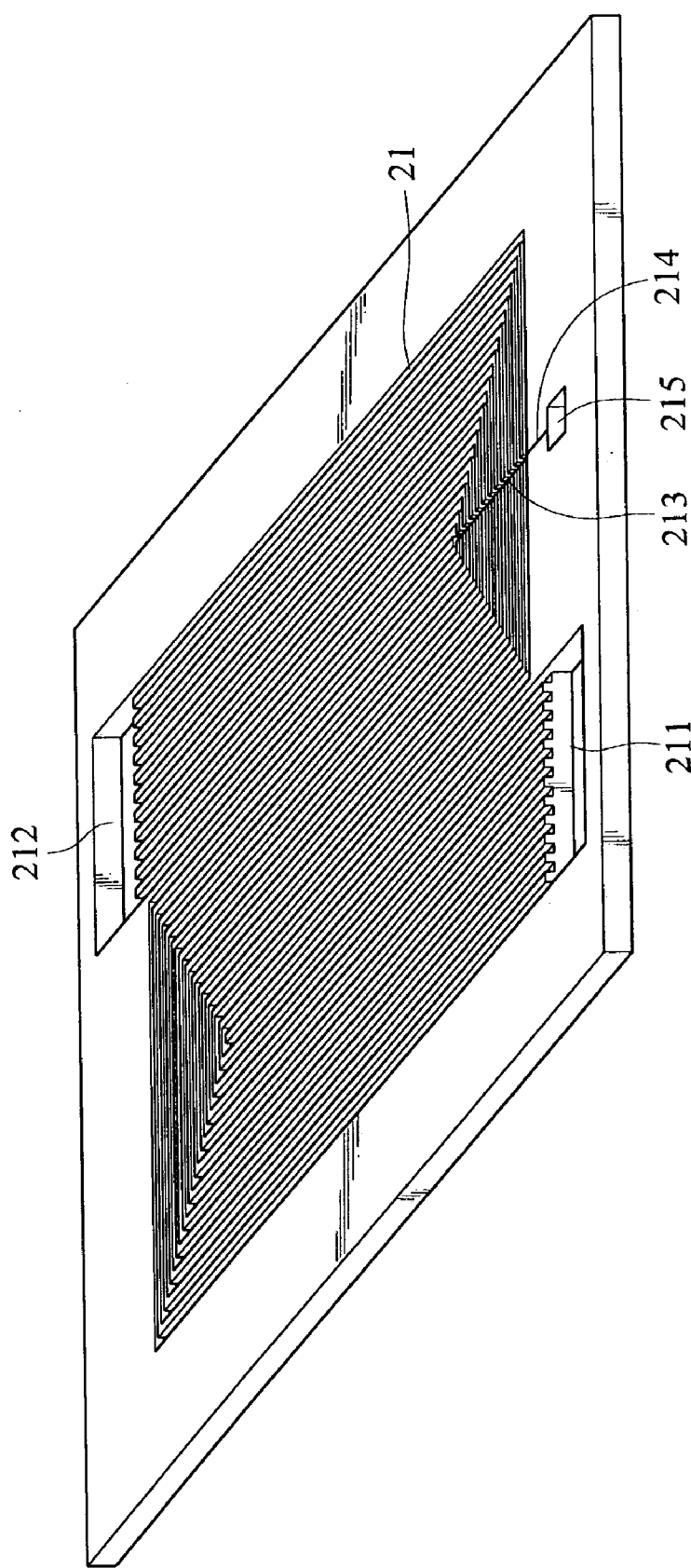
FIG. 4 is a three-dimensional view of the bipolar plate fuel channel on the anode side according to the invention.

The bipolar plate gas moisturizing apparatus of the fuel cell disclosed herein is shown in FIGS. 3 and 4. The fuel gas enters the fuel channel 21 through the fuel inlet 211. Through the electro-chemical reaction in the proton exchange membrane fuel cell (PEMFC), the reacted gas exhausts via the fuel outlet 212.

In the middle section of the fuel channel 21 on the anode side, a communication channel 213 horizontally connecting each fuel channel is installed. The communication channel 213 is connected with the permeating channel 214, so that water inside the moisturizing main pipe 215 can enter the communication channel 213. The fuel gas in the middle and later sections of the fuel channel 21 is moisturized. The internal resistance in the dryer area in the middle and later sections of the fuel channel thus decreases and the efficiency of the fuel cell is enhanced.

The middle section of the fuel channel 21 is installed horizontally a communication channel 213 in communications with each of the fuel channels 21. The position is roughly at the middle position or in the later section of the fuel channel 21.

The direction of the communication channel is perpendicular to the directions of the fuel channels 21 to moisturize the fuel gas in the middle and later sections of each fuel channel 21. When manufacturing the communication channel 213, the depth has to be larger than that of the fuel channels 21 so that its bottom can be attached with a layer of water-absorptive material 216. The water-absorptive material 216 can be non-woven cloth, absorbent cotton that can strongly absorb water. When designing the fuel channels 21 of the bipolar plate 20, the cross section area occupied by the water-absorptive material 216 is also considered so that they do not block the fuel channels 21.

The permeating channel 214 connected with the communication channel 213 is completely filled with the water-absorptive material 216, and the water-absorptive material 216 is connected with the moisturizing main pipe 215. Water continuously replenishes the communication channel 213 via the water-absorptive material 216 and thereby enters to moisturize the fuel gas in the fuel channel 21. Water can only flow in one direction from the moisturizing main pipe 215 into the communication channel 213, preventing hydrogen from leaking out of the fuel channel 21 via the permeating channel 214.

When water inside the communication channel 213 is absorbed by the fuel gas, the water-absorptive material 216 will quickly obtain water from the moisturizing main pipe 215. The humidity in the fuel channel 21 can be adjusted according to the evaporation rate, so that the fuel gas diffusion is not affected because of the fuel gas being too humid.

From the above description, we see that the fuel gas enters the fuel channel 21 via the fuel inlet 211. After the electrochemical reaction in the PEMFC, the fuel exhaust leaves via the fuel outlet 212.

Figure 5:
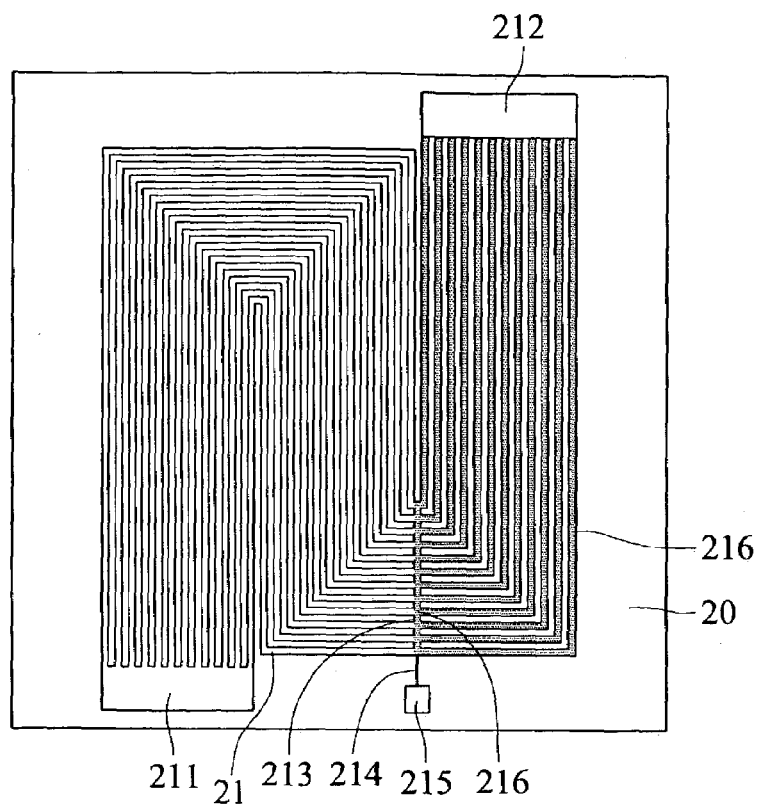
FIG. 5 is a top view of the communication channel, the fuel channel, and the permeating channel all attached with the water-absorptive material.

If one wants to enhance the moisturizing effect in the middle and later sections of the fuel channel 21, as shown in FIG. 5, a layer of water-absorptive material 216 can be attached to the bottom of each fuel channel 21 after the communication channel 213. This can absorb water from the moisturizing main pipe 215 so that the fuel gas can be moisturized after passing by the communication channel 213. The internal resistance of the fuel gas in the fuel channel 21 can be reduced to increase the efficiency of the fuel cell.

Figure 6:
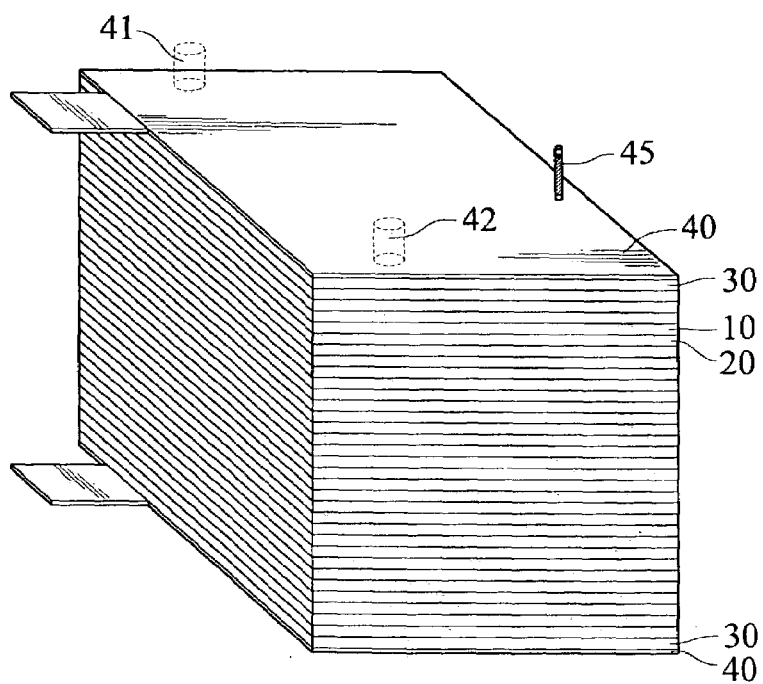
FIG. 6 shows the assembly of the disclosed fuel cell stack.

As shown in FIG. 6, the end board 40 on the border of the fuel cell has not only the fuel inlet 41, the oxidant inlet 42, the fuel outlet 44, and the oxidant outlet 43, but also a moisturizing main pipe stop valve 45 connected with the moisturizing main pipe 215. The moisturizing main pipe stop valve 45 can adjust the pressure in the permeating channel 214, so that the water can only flow in one direction from the moisturizing main pipe 215 to the fuel channel 21. Therefore, water flows into the fuel channel 21 and the fuel gas does not leak out.

To avoid the impurities inside the water from affecting the penetration of the protons through the proton exchange membrane, one may use deionized water to moisturize the fuel gas. This can ensure the normal operation of the PEMFC.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bipolar plate gas moisturizing apparatus for a proton exchange membrane fuel cell (PEMFC) formed with a plurality of bipolar plates and membrane electrode stacks, both sides of each of the bipolar plates having a plurality of fuel channels and oxidant channels for a fuel gas and an oxidant to flow through and to have electrochemical reactions via the membrane electrode stacks, wherein the bipolar plate gas moisturizing apparatus is characterized in that:
a communication channel being in fluid communications with each of the fuel channels at a middle section of the fuel channels and in fluid communications with a moisturizing main pipe through a permeating channel, the communication channel being located on at least one of the bipolar plates, and the bottom of the communication channel being attached with a layer of water-absorptive material and the permeating channel being filled with the water-absorptive material to supply a moisturizing water inside the moisturizing main pipe to the fuel channel to increase the humidity of the fuel gas therein.

2. The bipolar plate gas moisturizing apparatus of claim 1, wherein the moisturizing main pipe is connected to a moisturizing main pipe stop valve for adjusting the pressure in the permeating channel and preventing water from flowing backward to result in fuel gas leakage.

3. The bipolar plate gas moisturizing apparatus as claimed in claim 1, wherein the communication channel is perpendicular to each of the fuel channels.

4. The bipolar plate gas moisturizing apparatus as claimed in claim 1, wherein the water-absorptive material is a non-woven cloth.

5. The bipolar plate gas moisturizing apparatus as claimed in claim 1, wherein the water-absorptive material is an absorbent cotton.

6. The bipolar plate gas moisturizing apparatus as claimed in claim 1, wherein the moisturizing water is a deionized water.

7. The bipolar plate gas moisturizing apparatus of claim 1, wherein a second layer of the water-absorptive material is located in at least one of the fuel channels starting from an intersection of the communication channel and the at least one fuel channel to one end of the at least one fuel channel.

8. The bipolar plate gas moisturizing apparatus of claim 1, wherein the fuel channels are on the at least one of the bipolar plates.

9. The bipolar plate gas moisturizing apparatus of claim 10, wherein the fuel channels are on the at least one of the bipolar plates.

10. A bipolar plate gas moisturizing apparatus for a PEMFC formed with a plurality of bipolar plates and membrane electrode stacks, both sides of each of the bipolar plates having a plurality of fuel channels and oxidant channels for a fuel gas and an oxidant to flow through and to have electro-chemical reactions via the membrane electrode stacks, wherein the bipolar plate gas moisturizing apparatus is characterized in that:
a communication channel being in fluid communications with each of the fuel channels at a middle section of the fuel channels and in fluid communications with a moisturizing main pipe through a permeating channel, the communication channel is located on at least one of the bipolar plates, and the bottoms of the communication channel and the fuel channels after the fuel gas crossing the communication channel being attached with a layer of water-absorptive material and the permeating channel is also filled with the same water-absorptive material to supply a moisturizing water inside the moisturizing main pipe to the fuel channel to increase the humidity of the fuel gas therein.

11. The bipolar plate gas moisturizing apparatus as claimed in claim 10, wherein the moisturizing main pipe is connected to a moisturizing main pipe stop valve for adjusting the pressure in the permeating channel and preventing water from flowing backward to result in fuel gas leakage.

12. The bipolar plate gas moisturizing apparatus as claimed in claim 11, wherein the communication channel is perpendicular to each of the fuel channels.

13. The bipolar plate gas moisturizing apparatus as claimed in claim 11, wherein the water-absorptive material is a non-woven cloth.

14. The bipolar plate gas moisturizing apparatus as claimed in claim 11, wherein the water-absorptive material is an absorbent cotton.

15. The bipolar plate gas moisturizing apparatus as claimed in claim 11, wherein the moisturizing water is a deionized water.

16. A bipolar plate gas moisturizing apparatus for a proton exchange membrane fuel cell (PEMFC) formed with a plurality of bipolar plates and membrane electrode stacks, both sides of each of the bipolar plates having a plurality of fuel channels and oxidant channels for a fuel gas and an oxidant to flow through and to have electrochemical reactions via the membrane electrode stacks, wherein the bipolar plate gas moisturizing apparatus is characterized in that:

a communication channel being in fluid communications with each of the fuel channels at their middle section and in fluid communications with a moisturizing main pipe through a permeating channel, and the bottom of the communication channel being attached with a layer of water-absorptive material and the permeating channel being filled with the water-absorptive material to supply a moisturizing water inside the moisturizing main pipe to the fuel channel to increase the humidity of the fuel gas therein, wherein the moisturizing main pipe is connected to a moisturizing main pipe stop valve for adjusting the pressure in the permeating channel and preventing water from flowing backward to result in fuel gas leakage.

* * * * *